United States Patent
Komissarov et al.

(10) Patent No.: US 10,869,216 B2
(45) Date of Patent: *Dec. 15, 2020

(54) SYSTEM AND METHOD FOR MANAGING FILTERING RULES FROM A REMOTE SERVER

(71) Applicant: AO Kaspersky Lab, Moscow (RU)

(72) Inventors: Alexey P. Komissarov, Moscow (RU); Victor V. Yablokov, Moscow (RU); Alexey M. Chikov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,220

(22) Filed: Apr. 24, 2019

(65) Prior Publication Data

US 2019/0253913 A1    Aug. 15, 2019

Related U.S. Application Data

(63) Continuation of application No. 15/603,842, filed on May 24, 2017, now Pat. No. 10,321,349.

(30) Foreign Application Priority Data

Apr. 28, 2017    (RU) .............................. 2017115050

(51) Int. Cl.
| | |
|---|---|
| *H04W 28/02* | (2009.01) |
| *H04L 29/08* | (2006.01) |
| *H04L 29/06* | (2006.01) |
| *H04W 12/08* | (2009.01) |

(52) U.S. Cl.
CPC ...... *H04W 28/0215* (2013.01); *H04L 63/0227* (2013.01); *H04L 63/0263* (2013.01); *H04L 67/34* (2013.01); *H04W 12/0808* (2019.01)

(58) Field of Classification Search
None
See application file for complete search history.

(56) References Cited

U.S. PATENT DOCUMENTS

| | | | |
|---|---|---|---|
| 6,470,496 B1 | 10/2002 | Kato et al. | |
| 7,308,703 B2 | 12/2007 | Wright | |
| 10,321,349 B2 * | 6/2019 | Komissarov | ...... H04W 28/0215 |
| 2007/0245048 A1 * | 10/2007 | Mesut | .................. H04L 67/322 |
| | | | 710/105 |
| 2008/0014910 A1 | 1/2008 | Hsu et al. | |

(Continued)

*Primary Examiner* — Charles C Jiang
*Assistant Examiner* — Saad Khawar
(74) *Attorney, Agent, or Firm* — Arent Fox LLP; Michael Fainberg

(57) ABSTRACT

Techniques are provided for downloading of filtering rules from a remote server onto a mobile device. A priority list is determined from lists of filtering rules, the priority list having a highest indicator of frequency of actuation of the filtering rules from the lists. The filtering rules are designated for use by a first application on the mobile device. The priority list is transmitted to the mobile device with the aid of a second application, the second application on the mobile device being a provider of the filtering rules for the first application. Each of the remaining lists of filtering rules are divided into parts. Groups of filtering rules are generated based on frequency of actuation within each of the remaining lists of filtering rules, each group having not more than one part of each remaining list of filtering rules.

20 Claims, 3 Drawing Sheets

(56) References Cited

U.S. PATENT DOCUMENTS

| | | |
|---|---|---|
| 2011/0023108 A1 | 1/2011 | Geldermann et al. |
| 2011/0264804 A1 | 10/2011 | Vuksan |
| 2012/0005316 A1 | 1/2012 | Perry et al. |
| 2012/0172026 A1 | 7/2012 | Kwon et al. |
| 2014/0100963 A1 | 4/2014 | Ruan et al. |
| 2015/0334152 A1* | 11/2015 | Oyman ................ H04W 76/11 709/219 |
| 2018/0063232 A1 | 3/2018 | Chau |
| 2018/0152499 A1 | 5/2018 | Oyman |
| 2018/0239778 A1 | 8/2018 | Desai |

* cited by examiner

SYSTEM AND METHOD FOR MANAGING FILTERING RULES FROM A REMOTE SERVER

CROSS-REFERENCE TO RELATED APPLICATIONS

This application is a continuation of prior U.S. patent application Ser. No. 15/603,842, filed May 24, 2017, which claims benefit of priority under 35 U.S.C. 119(a)-(d) to a Russian Application No. 2017115050 filed on Apr. 28, 2017, both of which are incorporated by reference herein

FIELD OF TECHNOLOGY

The present disclosure relates to system and methods of downloading data, more specifically, methods of optimizing the downloading of data.

BACKGROUND

Modern mobile operating systems are becoming more and more closed off, and applications are isolated from each other and from the interior of the operating system. At the same time, companies producing operating systems understand and acknowledge certain problems of computer security, such as the threats which a user encounters when web surfing. Understanding the problems of computer security, the makers of operating systems are taking the path of providing to the makers of means for protecting users against cyberthreats a possibility of controlling the downloading of certain rules with which the operating system or a specific application will work. Thus, applications for protecting users against cyberthreats are becoming providers of rules, and these rules are used either by the operating system or by previously installed applications, for example, by means of the web browser plug-in or by means of a plug-in (the "CallDirectory" extension) to the "Telephone" application.

Mobile devices have limited resources such as battery charge, RAM, nonvolatile memory volume, and so on. Problems exist, such as the filtering of web content, which require a large number of rules. On the one hand, the greater the volume of rules loaded onto the mobile device, the higher the probability of blocking web content unwanted by the user, but the more negative the user experience (User eXperience, UX) with the web content filtering system becomes, since the loading of a large volume of rules may slow down the working of the mobile device, and in some instances becomes a cause of crashing of the application for which these rules are loaded. User experience is the perception and responses of a user resulting from the use and/or the previous use of a product, a system, or a service. On the other hand, the more rules, the higher the probability of detection of undesirable content (Detection Rate, DR). A conflict emerges between UX and DR. The more rules, the higher the DR and the worse the UX.

The Apple® company in version 9 of iOS® operating system introduced a new technology of content filtration, making it possible to provide the Safari™ web browser with a set of rules for blocking the display of a site in its entirety or concealing web content (advertising). The set of rules is an application in the form of a plug-in downloadable to Safari (a text file with a list of rules), which may constitute an unlimited or a limited number of rules, such as up to 50,000 content filtering rules. Figures of 50,000 rules are feasible at present, but may change in the course of time. An application may have several such plug-ins, each of which the user needs to turn on manually. The limiting to 50,000 rules was seen by Apple as a solution to the problem of finding a balance between UX and DR in view of the features of the working of the WebKit™ rendering engine component, on the basis of which the Safari browser was developed. Unfortunately, due to limitations of the mobile platform and the browser, Safari simply cannot handle the downloading of a large number of rules, and in some instances they take 10 to 20 minutes to download, and sometimes the downloading results in a crashing of the application and/or Safari. The problem is aggravated because applications have no control over the downloading of the rules, their role is confined to a provider of the rules ("content/rules providers").

This problem presents itself not only to Apple, but also to applications on other mobile operating systems, including Android®, downloading rules for web content filtering, parental controls, and DNT (Do Not Track).

The existing solutions for minimizing the likelihood of crashing of applications in the process of downloading of rules are aimed at curtailing the number of filtering rules: the fewer the filtering rules, the less the likelihood of a crash and the faster they are downloaded. However, a large number and good quality of filtering rules are needed to maintain a high DR.

SUMMARY

The present disclosure is designed to implement the downloading of a large volume of filtering rules onto the mobile device of a user. As a solution for the aforementioned problem, an algorithm has been developed with a delayed downloading of rules databases.

The technical result of the present disclosure includes decreasing the burden on resources of the mobile device in the process of downloading filtering rules by changing the parameters of the downloading of the filtering rules upon detecting critical situations in the working of the mobile device.

According to an exemplary aspect, a method is provided for downloading data including filtering rules from a remote server onto a mobile device. The method includes determining a priority list, from a plurality of lists of filtering rules, having a highest indicator of frequency of actuation of the filtering rules from the lists. The filtering rules from the lists are designated for use by a first application on the mobile device. The method includes transmitting the priority list to the mobile device with the aid of a second application, the second application on the mobile device being a provider of the filtering rules for the first application. The method further includes dividing each of the remaining lists of filtering rules into a plurality of parts having a first size and generating a plurality of groups of filtering rules based on frequency of actuation within each of the remaining lists of filtering rules. Each group of filtering rules includes a part of a first list of filtering rules and a part of a second, different list of filtering rules, and wherein in each of whose groups is placed not more than one part of each remaining list of filtering rules.

In another aspect, the method further includes transmitting the groups of filtering rules to the mobile device during time intervals having a first duration until the plurality of groups are fully downloaded onto the mobile device. In some aspects, the method further includes after transmitting each group of filtering rules to the mobile device, performing a check on the operation of the mobile device, and responsive to detecting a change in the operation of the mobile device, modifying at least one of the size of the plurality of parts and the duration of the time intervals.

In another aspect, the method further includes, responsive to detecting a change in the operation of the mobile device, re-dividing each of the remaining lists of filtering rules into a plurality of parts having a reduced size that is less than the first size.

In another aspect, the priority list is transmitted to the mobile device prior to transmitting the groups of filtering rules.

In another aspect, the second application comprises a security application that is isolated from the first application by an operating system of the mobile device.

In another aspect, the generation of the plurality of groups of filtering rules based on frequency of actuation within each of the remaining lists of filtering rules further includes generating a first group of filtering rules and a second group of filtering rules, wherein the first group of filtering rules is comprised of parts of the first and second lists of filtering rules with higher indicators of frequency of actuation than the parts of the first and second lists of filtering rules that comprise the second group of filtering rules; and transmitting the first group of filtering rules to the mobile device prior to transmitting the second group of filtering rules to the mobile device.

According to another exemplary aspect of the present disclosure, a system is provided for downloading data including filtering rules from a remote server onto a mobile device. The system includes a memory device storing a plurality of lists of filtering rules; and a processor coupled to the memory device. The processor is configured to determine a priority list, from a plurality of lists of filtering rules, having a highest indicator of frequency of actuation of the filtering rules from the list. The filtering rules from the lists are designated for use by a first application on the mobile device. The processor is further configured to transmit the priority list to the mobile device with the aid of a second application, the second application on the mobile device being a provider of the filtering rules for the first application, and divide each of the remaining lists of filtering rules into a plurality of parts having a first size. The processor is further configured to generate a plurality of groups of filtering rules based on frequency of actuation within each of the remaining lists of filtering rules. Each group of filtering rules includes a part of a first list of filtering rules and a part of a second, different list of filtering rules, and wherein in each of whose groups is placed not more than one part of each remaining list of filtering rules.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
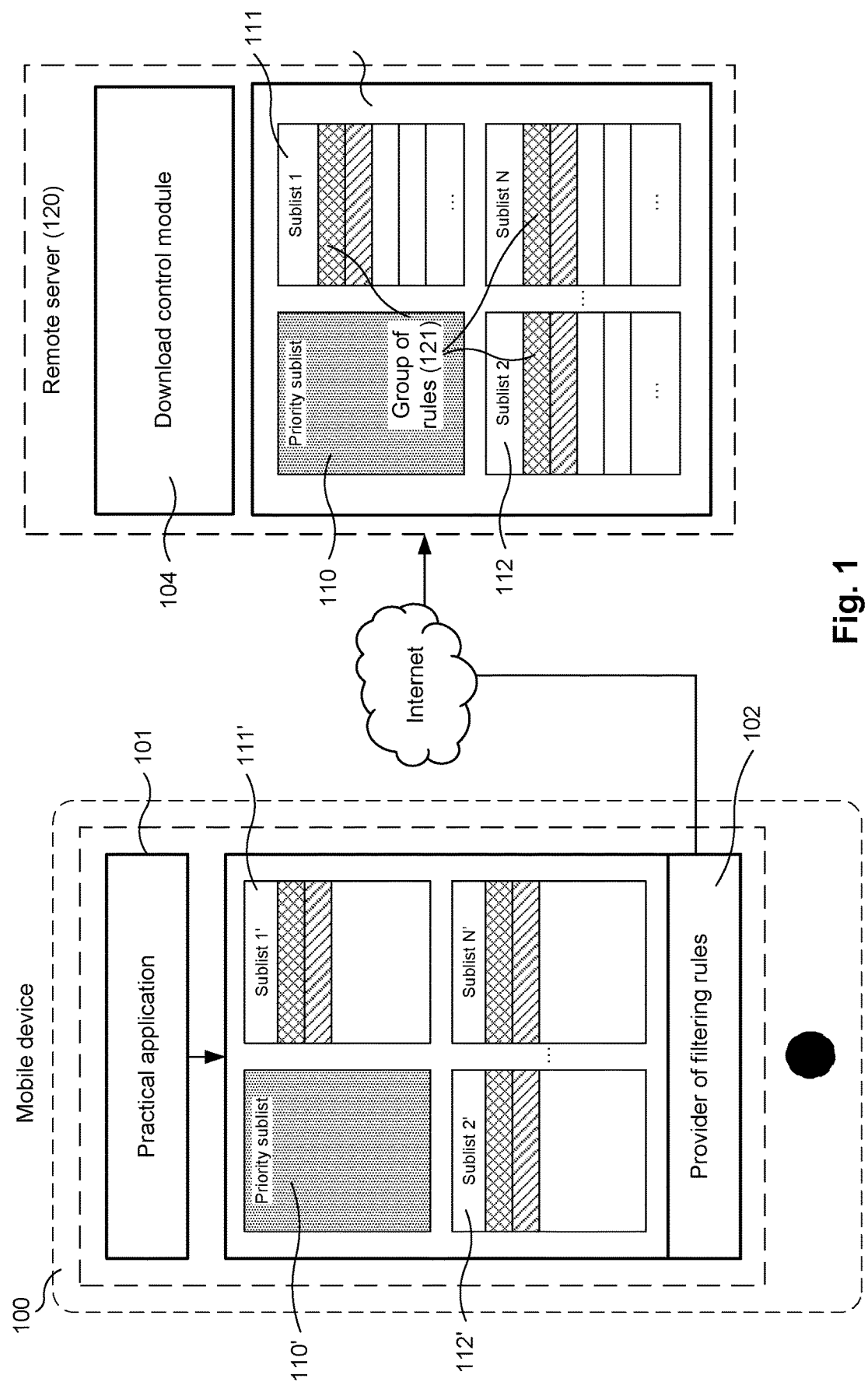
FIG. 1 illustrates a block diagram of a system for downloading filtering rules according to an exemplary aspect.

Example aspects are described herein in the context of a system, method and computer program product for downloading filtering rules onto a mobile device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

When a user installs an application in the operating system of a mobile device and activates the filtering functionality, that application becomes a provider of filtering rules, while the filtering is done directly by applications pre-installed in the operating system. For example, for the filtering of web content in the framework of the operating system iOS, the user installs a security application (such as Kaspersky ADCleaner™ made available by Kaspersky Lab), by means of which rules for the filtering of web content are downloaded onto the mobile device of the user. These rules utilize a pre-installed plug-in in the Safari browser, applying them to the content of the web pages visited by the user. We shall call the first application the application on the mobile device having the filtering functionality for which the filtering rules are intended. That is, the first application enables the performing of the filtering with the use of the corresponding filtering rules intended for the filtering of web content or telephone calls, or mobile device applications. We shall call the second application the application on the mobile device which is the provider of the filtering rules for the first application. For example, the security application (such as Kaspersky Who Calls™ made available by Kaspersky Lab) is the provider of filtering rules (the second application) for the practical application "Telephone" (the first application) which is built into or pre-installed on any given operating system of mobile devices and designed to make calls. The "Telephone" application has a built-in functionality for the filtering of incoming calls by telephone number. All of the filtering rules provided by the second application for the first application have a certain format consistent with the first application.

The exemplary aspects of the present disclosure which shall be disclosed in detail below can be used not only for downloading web content filtering rules for built-in applications in the framework of the Apple iOS operating system, but also in its entirety for the downloading of filtering rules for corresponding applications on mobile devices under the control of any given operating systems (iOS, Android, Windows Mobile and others) which are used to carry out a filtering of web content, parental control (filtering of actions or applications), filtering of incoming calls and messages by telephone number and/or message content. Thus, the rules which need to be downloaded onto a mobile device are known as filtering rules, while the web content filtering rules are a particular case of filtering rules. The term "web content filtering rules" shall be used afterwards in the text instead of the general term "filtering rules" for a more cogent description of the proposed technology on the example of a downloading of web content filtering rules in the framework of the operating system Apple iOS.

In one exemplary aspect a method is realized for the downloading of filtering rules onto a mobile device, whereby: (a) with the aid of a download control means, among at least two lists of filtering rules intended for downloading onto a mobile device there is determined one list with the highest indicator of frequency of actuation of the filtering rules from the list, these filtering rules from the lists being designated for use by the first application on the mobile device; (b) the list determined in step (a) is downloaded onto the mobile device with the aid of a second application, the second application on the mobile device being the provider of the filtering rules for the first application; (c) each of the remaining non-downloaded lists of filtering rules intended for downloading onto the mobile device is broken up into parts of a certain size with the aid of the download control means; (d) a set of groups of filtering rules is formed, in each of whose groups is placed not more than one part of each remaining non-downloaded list of filtering rules, with the aid of the download control means; (e) with the aid of the second application, the groups of filtering rules are downloaded onto the mobile device with a certain interval of time until said formed set of groups is fully downloaded; wherein upon detection by the second application of a critical situation in the working of the mobile device in the process of downloading a group of filtering rules onto the mobile device, steps c) to e) are carried out, reducing the size of the aforementioned parts and/or increasing the aforementioned interval of time.

The filtering rules are designed for the filtering of web content or telephone calls, or applications for mobile devices.

In another exemplary aspect, the aforementioned interval of time is increased only in the event that it is not possible to decrease the size of the aforementioned parts.

In yet another exemplary aspect, critical situations in the working of the mobile device are: crashing of the first application; decrease in free RAM of the mobile device down to a predetermined level; decrease in the volume of free space on the hard disk of the mobile device down to a predetermined level.

In another exemplary aspect, the downloading of the set of groups of filtering rules is done in sequence, starting with the group including filtering rules with the highest indicators of frequency of actuation, and ending with the group of rules with the lowest indicators of frequency of actuation.

FIG. 1 illustrates a block diagram of a system for downloading filtering rules according to an exemplary aspect. The system as shown includes at least a mobile device 100 and a remote server 120. The mobile device 100 includes a practical application 101 (i.e., a first application), and a provider of filtering rules 102 (i.e., a second application). The remote server 120 includes a download control module 104 and a database 103 storing a plurality of web content filtering rules. These filtering rules are designated for use by the application 101 on the mobile device.

The web content filtering rules which need to be downloaded onto the mobile device 100 of a user are broken up into several sublists 110, 111, 112 or, in other words, lists of rules, each of which has its own value to the user. The lists of rules 110, 111, 112 are stored in a database 103 on a remote server 120.

The downloading of rules onto the mobile device 100 is done by means of an application 102 which is a provider of filtering rules (the second application), while the filtering itself is done directly by a practical application 101 (the first application) pre-installed in the operating system of the mobile device 100. For example, in the framework of the operating system Apple iOS, the pre-installed practical application 101 for performing the web content filtering in the browser Safari will be a special plug-in, while the provider of filtering rules (the application 102) will be a security application (e.g., Kaspersky ADCleaner).

In one exemplary aspect, the download control module 104 may be configured to, among at least two lists of filtering rules intended for downloading onto a mobile device 100, determine one list (e.g., a "priority" sublist 110) with a highest indicator of frequency of actuation of the filtering rules from the list. The lists of rules from the database 103 which are intended for downloading onto the mobile device 100 are prioritized in importance, but there is one list, the most important (i.e., the priority sublist 110), which is determined by the indicator of the frequency of actuation of the rules on the list. This indicator is a characteristic of the lists of rules and contains information on how often the rules on the corresponding list are used (actuated). The higher this indicator for a list of rules, the more useful that list of rules to the user, and the more important it is for it to be downloaded first onto the mobile device to enhance the working efficiency of the corresponding application. Therefore, in the context of the present disclosure, the list with the highest indicator of frequency of actuation of the rules on the list may be assigned a high priority or level of importance relative to other lists.

The lists of rules may be thematic (content referencing weapons, violence, drugs, and so on), that is, contain a set of web content filtering rules aimed at guarding the user against content on the corresponding theme on the Internet. The lists of rules may be regional, aimed at blocking out advertising on Internet resources corresponding to a particular geographical region (Russian Federation (RF), Commonwealth of Independent States (CIS), Europe, and so on). In the general case, the lists of rules (sublists) are sets of filtering rules. There might not even be any criteria by which the filtering rules are assembled into lists. Alternatively the only unifying characteristic for a list of rules might be the expert company itself which composes and updates that list.

In one exemplary aspect, the download control module 104 may be configured to divide each of the remaining non-downloaded lists of filtering rules intended for downloading onto the mobile device 100 into parts of a certain size. The download control module 104 may be configured to form a set of groups of filtering rules, in each of whose groups is placed not more than one part of each remaining non-downloaded list of filtering rules. As described earlier, the priority sublist 110 of filtering rules is downloaded first, in order to provide a basic level of protection to the mobile device. The next step is the downloading of the groups of rules which include parts of fixed size from each of the remaining lists of rules (Sublist 1, Sublist 2, . . . , Sublist N). That is, each group of rules being downloaded onto the mobile device 100 is made up of not more than one part of the rules from each of the remaining lists of rules (for example, Rule group 121). If a list of rules still contains filtering rules for downloading onto the mobile device 100, the download control module 104 includes one part of the rules from this list of rules in the group of rules being downloaded. The parts of rules for downloading are formed from the rules with the highest frequency of actuation within each of the lists of rules. The purpose of such a downloading is to activate in the shortest period of time the working of all lists of rules on the mobile device of the user by filling them up in parallel, in an efficient manner, so that even a list of rules not fully downloaded has a good chance of actuation. This approach has a positive impact on the user experience with the filtering systems on mobile devices in the process of downloading rules without a resulting loss in the indicator of the detection rate.

In some exemplary aspects, the second application 102 is configured to download the groups of filtering rules onto the mobile device with a certain interval of time until said formed set of groups is fully downloaded. In one exemplary aspect, the application 102 analyzes the characteristics of the mobile device 100 to determine the performance index of the mobile device 100. If as a result of the analysis it is established that the performance index of the mobile device 100 is high (for example, in terms of an established threshold value of the index), then after downloading the most important list of the filtering rules 110 an attempt is made to simultaneously download all remaining lists of rules. If this attempt is unsuccessful, and not all of the remaining lists of rules can be downloaded straight away, or if the performance index of the mobile device 100 is low, then the above-described mechanism of fragmenting the lists is used for the downloading of the rules.

In the application 102 there is implemented a fault tolerance mechanism, making it possible to detect by various characteristics critical situations in the working of the mobile device 100 and/or the practical application 101. In keeping with the current policy of the makers of operating systems for mobile devices, the provider of the filtering rules (application 102) does not have access to the practical application 101, the two applications being isolated from each other. It can be difficult for the application 102 to obtain feedback as to the working of the application 101: the result of performing an operation might not be forthcoming, the errors seem unclear, the causes incomprehensible. However, the application 102 has access to the current parameters of the mobile device 100, by which in the context of the present disclosure the application 102 detects the following critical situations in the working of the mobile device 100:

- crashing of the application which is using the filtering rules being downloaded (the practical application 101);
- decrease in free RAM of the mobile device 100 down to a predetermined level;
- decrease in the volume of free space on the hard disk of the mobile device 100 down to a predetermined level.

The detection of a critical situation in the working of the mobile device 100 in the course of downloading the filtering rules is a trigger for changing the download strategy, by decreasing the size of the parts into which the remaining lists of rules are broken up (Sublist 1, Sublist 2, . . . , Sublist N). In one exemplary aspect, the second application 102 is configured to detect a critical situation in the working of the mobile device in the process of downloading a group of filtering rules onto the mobile device, and in response reduce the size of the aforementioned parts and/or increase the aforementioned interval of time.

In one exemplary aspect, the downloading of the aforementioned groups of filtering rules coming after the first group 121 of filtering rules into corresponding sublists on the mobile device 100 (Sublist 1', Sublist 2', . . . , Sublist N') is done in the background at specified (definite) intervals of time (such as 45 seconds) after the user minimizes the application 102 and switches to a different application. In this way, the downloading of the filtering rules is spaced out over time, so that it is possible to avoid competing for resources of the mobile device 100 with other applications and increase the reliability of the downloading of the lists of rules by significantly decreasing the risk of crashing of the practical application 101, since the filtering rules are being downloaded in relatively small blocks at the same time. The user at once obtains a rather fair quality of filtration by virtue of a single full-value search and gradual filling up of the remaining sublists with filtering rules with the largest frequency of actuation over the course of several minutes or dozens of minutes.

Figure 2:
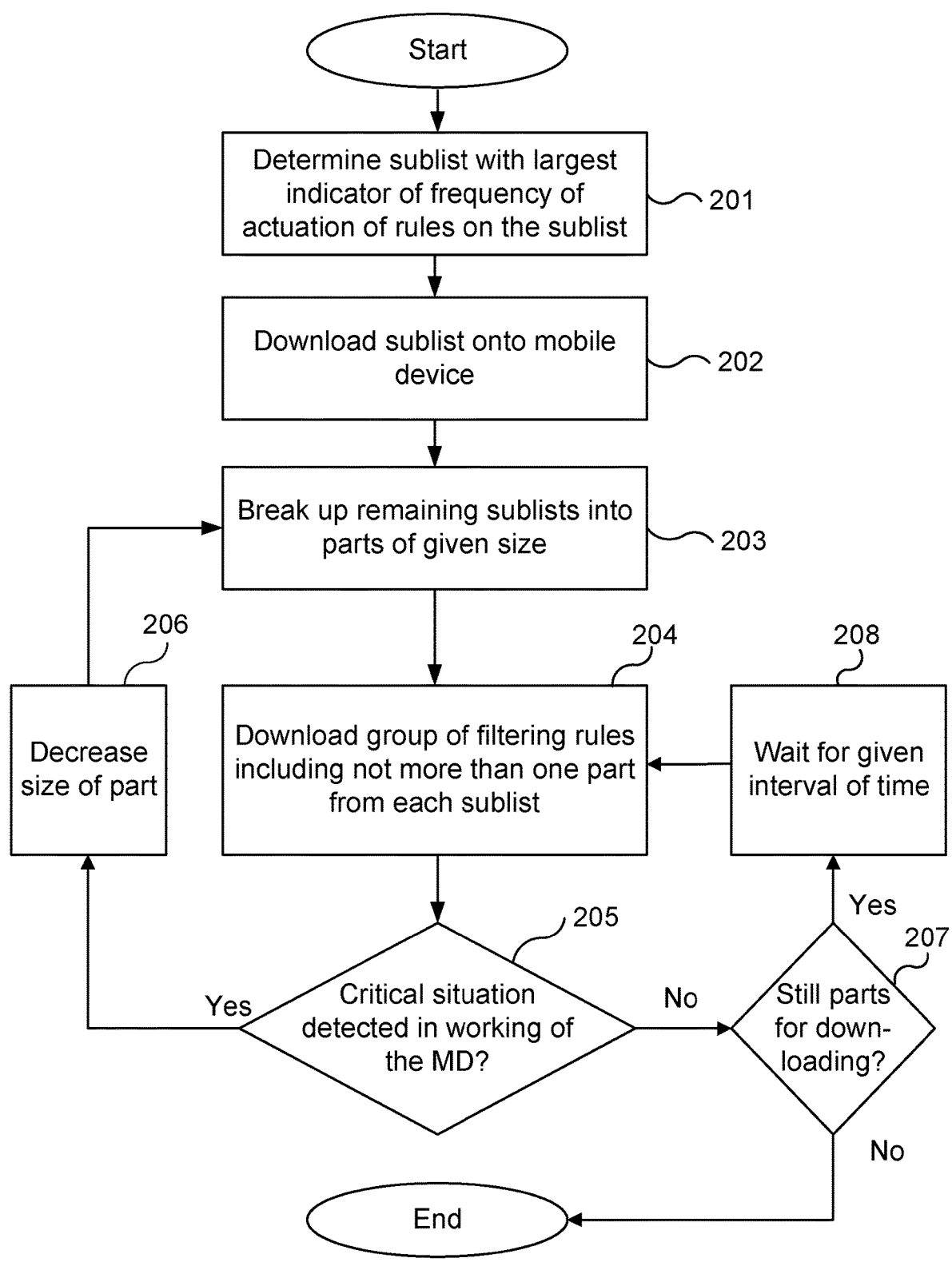
FIG. 2 illustrates a flowchart of a method of downloading filtering rules onto a mobile device according to an exemplary aspect.

FIG. 2 illustrates a flowchart of a method of downloading filtering rules onto a mobile device 100 according to an exemplary aspect. It is noted that the following description of the exemplary method makes reference to the system and components described above.

According to this method 200, in step 201 there is a determination of the sublist with the largest indicator of the frequency of actuation of the filtering rules by the sublist among all the sublists intended for downloading onto the mobile device 100. In some exemplary aspects, the download control module 104 determines a first list (e.g., priority sublist 110) from the plurality of lists of filtering lists having a highest indicator of frequency of actuation of the filtering rules from the list. The filtering rules from the lists may be designated for use by a first application (e.g., practical application 101) on the mobile device 100.

At step 202, this sublist can be fully downloaded onto the mobile device 100 for a rapid accomplishing of a good level of filtering (quality of filtering). In some exemplary aspects, the remote server 120 transmits the determined list to the mobile device with the aid of a second application 102 being the provider of filtering rules. As such, the second application 102 may download the determined priority list onto the mobile device 100.

The remaining sublists in step 203 are broken up into parts of a given size (blocks). In some exemplary aspects, the download control module 104 may divide each of the remaining non-downloaded lists of filtering rules intended for downloading onto the mobile device into a plurality of parts having a first size. The size of a block may be determined on the basis of the parameters of the mobile device 100. The size of the block is the bigger, the higher the productivity of the mobile device 100, and the lower the current level of utilization of the resources of the mobile device 100. In one exemplary aspect, the filtering rules in the remaining sublists are arranged according to their frequency of actuation. The downloading of the parts can be done in sequence, starting with the parts including filtering rules with the largest indicators of frequency of actuation, and ending with parts with the lowest indicators.

In some exemplary aspects, the downloading of the parts is done by groups of filtering rules, each of which includes not more than one part from each remaining sublist. At step 204, the download control module 104 may generate a set of groups of filtering rules in each of whose groups is placed not more than one part of each remaining non-downloaded list of filtering rules. In general, the download control module 104 transmits the group of filtering rules to the mobile device during time intervals having a first duration until the generated set of groups are fully downloaded onto the mobile device. The second application 102 downloads the groups of filtering rules onto the mobile device with a certain interval of time until said formed set of groups is fully downloaded.

After each downloading of a group of rules, in step 205 the built-in fault-tolerance mechanism of the application 102 performs a check to determine a critical situation in the working of the mobile device 100. In some exemplary aspects, the download control module 104 may detect a change in the operation of the mobile device, including such changes as a crashing of the first application, decrease in free memory of the mobile device down to a predetermined level, and decrease in a volume of free space on a storage device of the mobile device down to a predetermined level. The download control module may modify at least one of the size of the plurality of parts and the duration of the time intervals response to detecting the change in the operation of the mobile device.

In some exemplary aspects, upon detection by the second application of a critical situation in the working of the mobile device in the process of downloading a group of filtering rules onto the mobile device, steps 203, 204 are carried out, reducing the size of the aforementioned parts and/or increasing the aforementioned interval of time For example, at step 206, if a critical situation is detected, the download control module 104 may reduce the first size of the plurality of parts having the remaining non-downloaded lists of filtering rules. As such, the block size of the fragmentation of the sublists is decreased and operations may return to step 203, in which the remaining sublists are broken down into parts of corresponding decreased fixed size. In some exemplary aspects, the download control module 104 may increase the first duration of the time intervals for downloading the set of groups of filtering rules responsive to detecting a change in the operation of the mobile device. In some exemplary aspects, the time intervals are increased responsive to determining that the size of the parts are ineligible for a size decrease, for example, the size of the parts have already been reduced to a pre-determined minimum size and cannot be reduced further.

If no critical situation is found, then after waiting for the fixed interval of time in step 208 the downloading of the next group of filtering rules is done, provided that non-downloaded parts of sublists still remain. But if no parts remain for downloading, the rule downloading process is finished in step 207.

One of the goals of the present disclosure is to broaden the arsenal of technical means designed to carry out the downloading of a large number of filtering rules onto a user's mobile device. The following technical results may also be achieved in the context of the present disclosure: aspects of the present disclosure may reduce the workload of the resources of the mobile device in the process of downloading the filtering rules, thanks to a changing of the parameters of the downloading of the filtering rules when critical situations are detected in the working of the mobile device. Aspects of the present disclosure may also increase reliability of downloading the filtering rules onto a mobile device, which is achieved by the presence of a fault-tolerance mechanism which is able to change the parameters of the downloading of the filtering rules when critical situations are detected in the working of the mobile device, to ensure a complete downloading of all the filtering rules onto the mobile device. Aspects of the present disclosure also can ensure downloading of all filtering rules onto a mobile device, which is achieved by the presence of a fault-tolerance mechanism which is able to change the parameters of the downloading of the filtering rules when critical situations are detected in the working of the mobile device.

Figure 3:
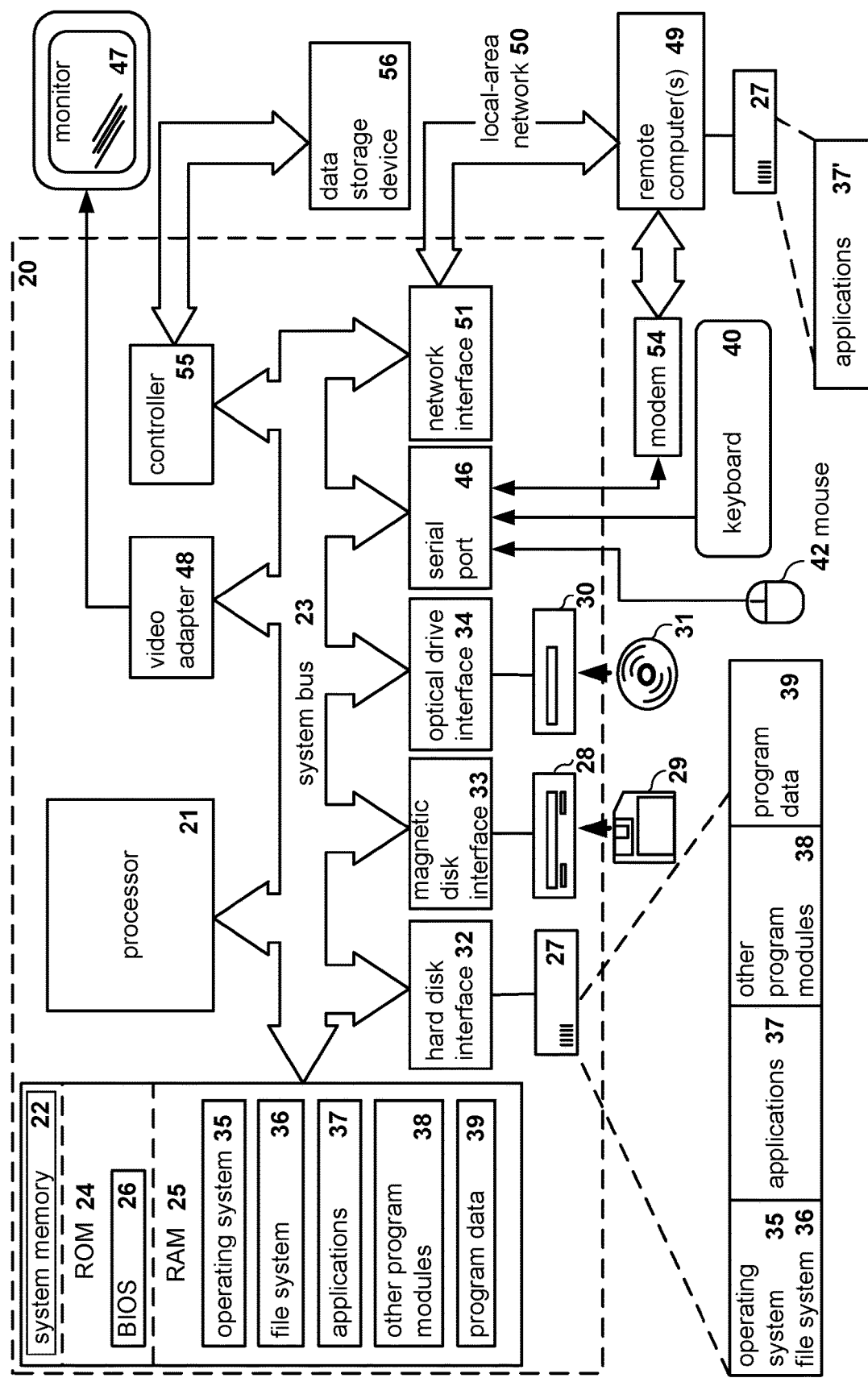
FIG. 3 illustrates a block diagram of a general-purpose computer system on which the disclosed system and method can be implemented according to an exemplary aspect.

FIG. 3 is a diagram illustrating a general-purpose computer system 20 on which aspects of systems and methods for scanning web pages may be implemented in accordance with an exemplary aspect. It should be noted that the computer system 20 can correspond to the mobile device 100 and remote server 120, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program 031185.01364 data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for downloading filtering rules from a remote server onto a mobile device, the method comprising:
   determining, from a plurality of lists of filtering rules, a priority list of filtering rules having a highest frequency of actuation among the filtering rules, wherein the filtering rules are designated for use by a first application on the mobile device;
   transmitting the priority list to the mobile device using a second application, the second application on the mobile device being a provider of the filtering rules for the first application;
   dividing each of remaining lists of filtering rules into a plurality of parts having a first size, wherein the remaining lists of filtering rules include lists of filtering rules other than the rules on the priority list; and
   generating a plurality of groups of filtering rules based on frequency of actuation within each of the remaining lists of filtering rules, wherein each group of filtering rules includes a part of a first list of filtering rules and a part of a second, different list of filtering rules, and wherein in each of whose groups is placed not more than one part of each remaining list of filtering rules.

2. The method of claim 1, further comprising:
   transmitting the groups of filtering rules to the mobile device during time intervals having a first duration until the plurality of groups are fully downloaded onto the mobile device.

3. The method of claim 2, further comprising:
   after transmitting each group of filtering rules to the mobile device, checking operation of the mobile device;
   responsive to detecting a change in the operation of the mobile device, modifying at least one of the first size of the plurality of parts and the first duration of the time intervals.

4. The method of claim 1, further comprising:
   responsive to detecting a change in the operation of the mobile device, re-dividing each of the remaining lists of filtering rules into a plurality of parts having a reduced size that is less than the first size.

5. The method of claim 1, wherein the priority list is transmitted to the mobile device prior to transmitting the groups of filtering rules.

6. The method of claim 1, wherein the second application comprises a security application that is isolated from the first application by an operating system of the mobile device.

7. The method of claim 1, wherein generating the plurality of groups of filtering rules based on frequency of actuation within each of the remaining lists of filtering rules further comprises:
generating a first group of filtering rules and a second group of filtering rules, wherein the first group of filtering rules is comprised of parts of the first and second lists of filtering rules with higher indicators of frequency of actuation than the parts of the first and second lists of filtering rules that comprise the second group of filtering rules; and
transmitting the first group of filtering rules to the mobile device prior to transmitting the second group of filtering rules to the mobile device.

8. A system for downloading data including filtering rules from a remote server onto a mobile device, wherein the system comprises:
a memory device storing a plurality of lists of filtering rules; and
a processor coupled to the memory device and configured to:
determine, from a plurality of lists of filtering rules, a priority list of filtering rules having a highest frequency of actuation among the filtering rules, wherein the filtering are designated for use by a first application on the mobile device;
transmit the priority list to the mobile device using a second application, the second application on the mobile device being a provider of the filtering rules for the first application;
divide each of remaining lists of filtering rules into a plurality of parts having a first size, wherein the remaining lists of filtering rules include lists of filtering rules other than the rules on the priority list; and
generate a plurality of groups of filtering rules based on frequency of actuation within each of the remaining lists of filtering rules, wherein each group of filtering rules includes a part of a first list of filtering rules and a part of a second, different list of filtering rules, and wherein in each of whose groups is placed not more than one part of each remaining list of filtering rules.

9. The system of claim 8, wherein the processor is configured to:
transmit the groups of filtering rules to the mobile device during time intervals having a first duration until the plurality of groups are fully downloaded onto the mobile device.

10. The system of claim 9, wherein the processor is configured to:
after transmitting each group of filtering rules to the mobile device, check operation of the mobile device;
responsive to detecting a change in the operation of the mobile device, modify at least one of the first size of the plurality of parts and the first duration of the time intervals.

11. The system of claim 8, wherein the processor is configured to:
responsive to detecting a change in the operation of the mobile device, re-divide each of the remaining lists of filtering rules into a plurality of parts having a reduced size that is less than the first size.

12. The system of claim 8, wherein the priority list is transmitted to the mobile device prior to transmitting the groups of filtering rules.

13. The system of claim 8, wherein the second application comprises a security application that is isolated from the first application by an operating system of the mobile device.

14. The system of claim 8, wherein the processor is configured to generate the plurality of groups of filtering rules based on frequency of actuation within each of the remaining lists of filtering rules is further configured to:
generate a first group of filtering rules and a second group of filtering rules, wherein the first group of filtering rules is comprised of parts of the first and second lists of filtering rules with higher indicators of frequency of actuation than the parts of the first and second lists of filtering rules that comprise the second group of filtering rules; and
transmit the first group of filtering rules to the mobile device prior to transmitting the second group of filtering rules to the mobile device.

15. A non-transitory computer readable medium comprising computer executable instructions for downloading data including filtering rules from a remote server onto a mobile device, including instructions for:
determining, from a plurality of lists of filtering rules, a priority list of filtering rules having a highest frequency of actuation among the filtering rules, wherein the filtering rules are designated for use by a first application on the mobile device;
transmitting the priority list to the mobile device using a second application, the second application on the mobile device being a provider of the filtering rules for the first application;
dividing each of remaining lists of filtering rules into a plurality of parts having a first size, wherein the remaining lists of filtering rules include lists of filtering rules other than the rules on the priority list; and
generating a plurality of groups of filtering rules based on frequency of actuation within each of the remaining lists of filtering rules, wherein each group of filtering rules includes a part of a first list of filtering rules and a part of a second, different list of filtering rules, and wherein in each of whose groups is placed not more than one part of each remaining list of filtering rules.

16. The non-transitory computer readable medium of claim 15, further comprising instructions for:
transmitting the groups of filtering rules to the mobile device during time intervals having a first duration until the plurality of groups are fully downloaded onto the mobile device.

17. The non-transitory computer readable medium of claim 16, further comprising instructions for:
after transmitting each group of filtering rules to the mobile device, checking operation of the mobile device;
responsive to detecting a change in the operation of the mobile device, modifying at least one of the first size of the plurality of parts and the first duration of the time intervals.

18. The non-transitory computer readable medium of claim 15, further comprising instructions for:
responsive to detecting a change in the operation of the mobile device, re-dividing each of the remaining lists of filtering rules into a plurality of parts having a reduced size that is less than the first size.

19. The non-transitory computer readable medium of claim 15, wherein the priority list is transmitted to the mobile device prior to transmitting the groups of filtering rules.

20. The non-transitory computer readable medium of claim 15, wherein the instructions for generating the plurality of groups of filtering rules based on frequency of actuation within each of the remaining lists of filtering rules further comprising instructions for:
- generating a first group of filtering rules and a second group of filtering rules, wherein the first group of filtering rules is comprised of parts of the first and second lists of filtering rules with higher indicators of frequency of actuation than the parts of the first and second lists of filtering rules that comprise the second group of filtering rules; and
- transmitting the first group of filtering rules to the mobile device prior to transmitting the second group of filtering rules to the mobile device.

* * * * *